United States Patent Office 3,335,552
Patented Aug. 15, 1967

3,335,552
PROCESS FOR HARVESTING COTTON
William S. James, Memphis, Tenn., assignor, by mesne assignments, to Chevron Research Company, a corporation of Delaware
No Drawing. Filed Oct. 16, 1964, Ser. No. 404,528
10 Claims. (Cl. 56—1)

ABSTRACT OF THE DISCLOSURE

Process for harvesting substantially unstained cotton fiber from cotton plants comprising treating the plants with a sufficient amount of ammonia and under conditions which will substantially defoliate the plants in about 8 to 10 days after the treatment and harvesting the cotton crop from the treated plants by either mechanical picking or mechanical stripping about 1 to 48 hours after the treatment.

---

This is a continuation-in-part of my copending application Ser. No. 398,403, filed Sept. 22, 1964, now abandoned.

This invention relates to living plants. In one specific aspect it relates to an improved process for harvesting the crop from cotton plants.

In summary, this invention is directed to a process for substantially eliminating the ability of the leaf juices of growing cotton plants to stain the fiber during the harvesting of the cotton crop comprising: (1) Treating said plants with ammonia under conditions which will substantially defoliate said plants in about 8–10 days after the ammonia treatment; and (2) Harvesting the cotton crop from the thus treated plants about 1–48 hours after said treatment.

In the commercial growing of cotton it has been customary to make two or more harvestings because all of the bolls do not ripen at the same time. Bolls on the lower branches mature first, and opening of the bolls on the upper branches occurs over a period of several weeks after the lower bolls have matured. A cotton crop can be harvested by picking the fiber and seeds from the ripened bolls and recovering the thus harvested fiber and seeds; alternatively said crop can be harvested by stripping the bolls (or in some instances a portion of each boll including the seed and fiber in said boll) from the cotton plants and subsequently separating the cotton fiber and seeds from the boll hulls and other trash and recovering the fiber and seeds. Both cotton picking and cotton stripping can be done by hand or mechanically. However, in recent years the shortage and cost of labor and the trend toward large scale farming have rendered the mechanical harvesting of cotton economically attractive.

It is well known that the presence of green leaves on cotton plants is a severe handicap when harvesting the cotton crop with conventional (e.g., rotating spindle and endless belt type) cotton pickers and conventional (e.g., roller and rotating brush) cotton strippers because the moving parts of mechanical harvesters bruise many leaves and bring the bruised leaves into contact with the fiber, thereby producing an excessive quantity of stained cotton fiber.

The crop is often picked from the lower bolls before the upper bolls ripen. Subsequent to harvesting the crop from the lower bolls, the growing cotton plants are treated with a defoliating agent. Then, after the upper bolls ripen and after defoliation of the treated plants occurs, a second harvesting is made with a mechanical cotton harvester. In some instances, especially if labor is scarce, the first harvesting is dispensed with. This procedure often results in the production of a lower grade cotton crop because cotton fiber in the ripened and shaded lower bolls, especially in humid areas, can be attacked by molds and other microorganisms which discolor and rot the fiber. Nevertheless, said procedure can be economically attractive.

Since mechanical stripping is considerably less costly than hand or mechanical picking, it has been the custom in areas where the yield of cotton per acre is low to dispense with the first picking. The plants are treated with a desiccating agent which kills the leaves and sets a substantial portion of the thus killed leaves so that they do not drop from the treated plants, then the bolls are mechanically stripped from the desiccated plants. Cotton harvested in this manner contains more trash (stems, leaf particles, and the like) and is generally of a lower grade than cotton harvested by hand or mechanical picking. However, it is becoming economically attractive to use mechanical stripping in areas when the yield of cotton per acre is high. This development is due to improve ginning tehniques (which make it possible to remove substantial quantities of trash from cotton harvested by stripping) and to the fact that it is frequently economically advantageous to produce a slightly lower grade cotton (at an appreciably lower production cost) and sell said cotton at a slightly reduced price.

I have made the unexpected and completely unobvious discovery that the problem of staining cotton fiber by juices exuded from the leaves of cotton plants can be substantially eliminated by treating the growing cotton plants with ammonia, under conditions which will substantially defoliate said plants in about 8–10 or 12 days after the ammonia treatment, and harvesting the crop from the thus treated plants after the leaves have wilted but before said leaves have fallen and before said leaves to have become substantially dry. This process is designated wilt harvesting. When said harvesting process is conducted by picking cotton fiber and seeds from the ammonia treated plants, the process is called wilt picking. Said process is called wilt stripping when the harvesting process is conducted by stripping bolls from the ammonia treated plants.

I have found that the cotton crop should be harvested about 1–24 or 48 hours, preferably 2–12 hours, after treating the cotton plants with ammonia. Said harvesting can be done by hand or with mechanical cotton harvesters (i.e., cotton pickers or cotton strippers).

The leaves of the ammonia treated cotton plants remain firmly attached to the stems of the plants for at least about 24–48 hours after the ammonia treatment. Since the leaves do not drop off during picking, they do not contribute undesirable trash to the harvested fiber. Accordingly, my invention makes it possible to use a conventional cotton picker (e.g., a picker with rotating spindles, endless rotating belts, or other type cotton picker) to pick the cotton crop (fiber and seeds) from the ripened bolls on the lower branches of ammonia treated cotton plants before defoliation occurs and before the upper bolls have matured. The thus picked fiber is substantially free of trash (leaves, twigs, and the like) and said fiber is also substantially unstained by juices exuded from the leaves. If one delays too long (e.g., ca. 3–5 days) after the ammonia treatment before picking the fiber from the ammonia-treated plants, the leaves, which have become substantially dry, but have not started to drop from the stems, will shatter during picking, thereby adding trash to fiber gathered by a mechanical picker. After a longer delay (e.g., about 5 or 6 days) the leaves will drop from the stems during picking, whereby trash is added to the fiber gathered by the mechanical picker. However, as stated supra, substantial quantities of trash do not accumulate in the fiber harvested during the first picking if said picking is made within about the first day after treating the growing plants with ammonia. When using this procedure, a second harvesting, directed to the crop in the upper bolls and to any late ripening lower bolls, is made *after* defoliation has occurred (e.g., ca. 10–18 days after treating the cotton plants with ammonia). Substantially all of the upper bolls ripen in the interval between the ammonia treatment and the second harvesting.

It is, for economic reasons, frequently desirable to dispense with the separate picking of the cotton crop from the early ripening lower bolls. In instances when said separate picking is not used, my invention makes it possible to harvest the entire crop (from both lower and upper bolls) without substantially staining the cotton fiber with leaf juices. In such instances the cotton plants, on which most or substantially all of the bolls (both lower and upper bolls) have ripened, are treated with ammonia under conditions which will substantially defoliate said plants in about 8–10 days after the ammonia treatment, and the cotton crop is harvested from the thus treated plants about 1–48 hours, preferably 2–12 hours, after the ammonia treatment. Harvesting (picking or stripping) can be done by hand or mechanically. The harvested cotton fiber is substantially free of leaf stain, and, in those instances when the harvesting consists of stripping, the harvested crop contains less pin trash than a crop stripped from desiccated cotton plants.

It is possible to strip substantially all bolls (both upper and lower bolls) from cotton plants a few hours after applying ammonia to plants with ripe lower bolls and green upper bolls. However, from an economic standpoint, such a procedure would generally be unsound because the green top bolls would produce substantially no cotton fiber. It is also possible to use a cotton stripper which is designed or adjusted to selectively strip the lower bolls while leaving the unripened upper bolls on the cotton plants. However, when selectively harvesting the crop in the lower bolls I prefer to use a cotton picker adjusted to pick the crop from the lower bolls.

I have found that equally satisfactory results can be obtained by applying the ammonia in the form of a mist of liquid anhydrous ammonia or by applying it as vapor. However, the method of applying ammonia to the plants is not a part of this invention. I have obtained very excellent results when applying ammonia at rates ranging from about 75 to about 125 lbs. of ammonia per acre; in still other runs I obtained excellent results with ammonia rates ranging from about 60 to about 140 lbs. per acre; however, I have found that the optimum rate is about 80 to 90 or 100 lbs. of ammonia per acre.

If the cotton is harvested (especially if harvested mechanically) too soon after treating the cotton plants with ammonia, juices exuded from the leaves will stain the fibers about as badly as though the plants had not been treated, hence, it is necessary to wait for a period of about 1–48, preferably 2–12 hours after treating the cotton plants with ammonia before harvesting the crop from the thus treated plants. The duration of this waiting period depends on a wide variety of environmental conditions (e.g., wind or the absence thereof, sunshine or the absence thereof, ambient temperature, and humidity) and the condition of the cotton plants (e.g., drought stressed vs. rank plants and stage of growth and maturity of the plants). I have found that it is usually preferable to wait at least about 2 hours after treating cotton plants with ammonia before stripping the crop from the ammonia treated plants. Leaf stain may occur if a shorter waiting period is used. In general, those factors which assist the wilting (and subsequent drying) of the treated leaves tend to shorten said waiting period. For example, when the ambient temperature of a cotton field is about 95° F., the waiting period is about 1–1.5 or 2 hours while at about 80° F. said period is about 4–6 or 8 hours. Although I do not wish to be bound by theory, it appears that said period is the time required for ammonia to destroy the vital processes of the treated leaves.

I have found that harvesting cotton from ammonia-treated cotton plants according to the process of my invention does not affect in any way the defoliation of the thus treated plants. Defoliation of the treated plants is usually 95% to 100% complete within about 8 days to 10 days after treatment. This is identical to the results obtained in the normal defoliation of cotton plants with ammonia.

Defoliation of cotton plants with ammonia is described on page 32 of the August 1961 issue of the Southwestern Edition of the Farm Journal, in U.S. Patent No. 3,095,298, and in Colombian Patent No. 13,398.

My invention is illustrated by the following examples which are illustrative only and which are not intended to limit the scope of the invention. The process of my invention works equally well when harvesting the cotton crop by hand or with any type of mechanical cotton picker or mechanical cotton stripper.

In Examples I through IX ammonia was applied to growing cotton plants during the daylight hours (e.g., ca. 8 a.m. to 5 p.m.). In each instance, leaves on plants exit the hood of the ammonia defoliator in which said growing plants had been exposed to ammonia were considerably lighter green than those of untreated plants. Within about 15–40 minutes, the leaves on the treated plants developed a bronze color, and in about 1.5–6 hours said leaves felt limp or wilted but not dry when touched.

*Example I*

The cotton field used in this example consisted of a lush growth of cotton plants having a large number of completely ripened bolls on both the lower and upper branches. A mist of micron size particles of liquid anhydrous ammonia was fed at the rate of about 88 lbs. per acre into the fore portion of the hood of an ammonia foliator as the hood was moved along the crop row at a speed of about 3–5 miles per hour. Ambient temperature in the field was about 96° F. About 1.5 hours after treating the cotton plants with ammonia a spindle type cotton picker was moved along the crop row; said cotton picker picked fiber from the ripened bolls. The picked cotton fiber was substantially free of leaf stain and trash. In 10 days defoliation of the treated plants was at least about 98% complete.

*Example II*

The general procedure of Example I was repeated, and in this instance (as in Example I) the ambient temperature in the cotton field was about 96° F., but in this instance the cotton picker was not passed along the cotton row until about 6 hours after the cotton plants had been treated with ammonia. Results of this run were substantially the same as those obtained in Example I.

*Example III*

The general procedure of Example I was repeated. In this instance the ambient temperature in the cotton field was about 98° F. However, in this instance the cotton picker was run along the crop row about 0.5 hour after treating the cotton plants with ammonia. While the cotton fibers picked in this example were substantially free from trash, a very substantial quantity of the cotton fiber was stained by juices exuded from the leaves.

*Example IV*

The general procedure of Example I was repeated; however, in this instance only the lower bolls were ripe when the ammonia was applied, ambient temperature in the field was about 80° F., and the ammonia rate was 132 lbs. per acre. About 9 hours after applying the ammonia, a spindle type cotton picker was passed along the treated crop row, whereby the cotton crop was picked from the ripened lower bolls. The picked fiber was substantially free of both trash and leaf stain. Substantially all of the upper bolls had ripened and defoliation of the treated plants was substantially complete about 10 days after applying the ammonia. The crop was picked mechanically from the ripened upper bolls about 2 weeks after treating the plants with ammonia. The fiber picked from said bolls was substantially free of both leaf stain and trash.

*Example V*

The procedure of Example IV was repeated in a cotton field having an ambient temperature of about 80° F., but in this instance the first picking was made about 20 hours after the plants had been treated with ammonia. The results were substantially identical to those obtained in Example IV.

*Example VI*

The procedure of Example IV was repeated in a cotton field having an ambient temperature of about 80° F., but in this instance the first picking was made about 1–1.5 hours after the ammonia treatment. The results were substantially identical to those obtained in Example IV except that a very substantial quantity of fiber harvested in the first picking was stained by juices exuded from the leaves.

*Example VII*

The general procedure of Example I was repeated when the ambient temperature of the cotton field was about 84° F., but in this instance the ammonia was applied in the form of vapor at the rate of about 123 lbs. per acre and the cotton picker was passed along the crop row about 8–10 hours after the plants had been treated with ammonia. The results were identical to those obtained in Example I.

*Example VIII*

The general procedure of Example I was repeated in a cotton field having an ambient temperature of about 92° F., but in this instance the cotton crop was harvested with a mechanical stripper about 4–5 hours after treating the cotton plants with ammonia. The harvested crop was ginned and the fiber was examined and found to be substantially free of leaf stain and to contain substantially less pin trash than was obtained by stripping the crop from desiccated cotton plants in the same field.

*Example IX*

The general procedure of Example VIII was repeated in a cotton field having an ambient temperature of about 94° F., but in this instance the cotton crop was harvested with a mechanical stripper about 0.5 hour after treating the cotton plants with ammonia. Examination of the ginned cotton fiber showed that said fiber contained a smaller quantity of pin trash than that present in fiber obtained by ginning a crop stripped from desiccated cotton plants in the same field. However, a substantial quantity of the fiber obtained from the ammonia treated cotton plants had been stained by juices exuded from the leaves.

*Example X*

A ball of cotton 1″ in diameter was deliberately stained by crushing it against a freshly plucked leaf of a rank cotton plant. (To perform this experiment it is preferred that the leaf be turned face down on a hard solid surface exposing the underside of the leaf to the cotton ball which is crushed on the leaf with a blunt instrument such as a hammer. This will disperse stains of chlorophyll on the cotton fibers.) The thus stained cotton ball was then used as a plug in a test tube partially filled with aqua ammonia. Within minutes the green coloration turned to bronze, and within a few hours the color was dark brown.

In view of the foregoing experiment it was indeed surprising that a mechanical cotton harvester was able to harvest the crop from ammonia-treated cotton plants under the conditions reported in Examples I, II and V–VIII hereof without developing a bronze or brown stain on the harvested cotton fiber, since, under identical conditions, using the same equipment, but omitting the ammonia application, the harvested coton fiber was so stained by juice exuded by the leaves that the grade, or quality, of the fiber was substantially lowered, thereby lowering the price that the farmer could obtain for the crop.

While I do not wish to be bound by any theory as to why an ammonia treated leaf is non-staining, it would appear that such treatment destroys the vital processes of the leaf, resulting in a greatly decreased liquid pressure within the cells, veins and capillaries of the leaf structure thereby minimizing liquid effusion as the leaf is broken.

What is claimed is:

1. A process for substantially eliminating the ability of the leaf juices of growing cotton plants to stain the cotton fiber during the harvesting of the cotton crop comprising:
    (a) treating said plants with ammonia under conditions which will substantially defoliate said plants in about 8–10 days after the ammonia treatment; and
    (b) harvesting the cotton crop from the thus treated plants about 1–48 hours after said treatment.

2. The process of claim 1 in which the cotton fiber is picked from the ammonia treated cotton plants with a mechanical cotton picker.

3. The process of claim 1 in which the cotton bolls are stripped from the ammonia treated cotton plants with a mechanical cotton stripper.

4. The process of claim 2 in which the cotton fiber is picked about 2–12 hours after treating the cotton plants with ammonia.

5. A process for harvesting substantially unstained cotton fiber from cotton plants comprising:
    (a) treating said plants, after substantially all of the bolls have ripened, with ammonia under conditions which will defoliate said plants in about 8–10 days after ammonia treatment; and
    (b) harvesting the crop from the thus treated plants while the leaves of said plants are wilted, before said leaves have fallen, and before said leaves have become substantially dry.

6. The process of claim 5 in which the cotton crop is picked with a mechanical cotton picker.

7. The process of claim 5 in which the bolls are stripped from the cotton plants with a mechanical cotton stripper.

8. A process for harvesting substantially unstained cotton fiber from the late ripening upper bolls of cotton plants comprising:
    (a) treating said plants, after harvesting the cotton crop from the early ripening lower bolls and after the upper bolls have ripened, with ammonia under conditions which will defoliate said plants in about 8–10 days after the ammonia treatment; and
    (b) harvesting the cotton crop from said upper bolls of the thus treated plants while the leaves of said plants are wilted, before said leaves have fallen, and before said leaves have become substantially dry.

9. The process of claim 8 in which the cotton crop is picked from said upper bolls with a mechanical cotton picker.

10. The process of claim 8 in which said upper bolls are stripped from the cotton plants with a mechanical stripper.

References Cited

UNITED STATES PATENTS

| | | | |
|---|---|---|---|
| 2,701,437 | 2/1955 | Richey et al. | 56—33 |
| 3,095,298 | 6/1963 | Fisher et al. | 71—2.2 |
| 3,174,267 | 3/1965 | Bopf | 56—44 |
| 3,238,667 | 3/1966 | Remmert | 41—1.7 |
| 3,238,668 | 3/1966 | Abbott et al. | 41—1.7 |

ABRAHAM G. STONE, *Primary Examiner.*

RUSSELL R. KINSEY, *Examiner.*